(12) United States Patent
Suzuki

(10) Patent No.: US 9,849,750 B2
(45) Date of Patent: Dec. 26, 2017

(54) MOUNTING STRUCTURE OF RESIN COMPONENTS

(71) Applicant: NIHON PLAST CO., LTD., Fujinomiya-shi, Shizuoka (JP)

(72) Inventor: Takashi Suzuki, Fujinomiya (JP)

(73) Assignee: NIHON PLAST CO., LTD., Fujinomiya-shi (JP)

( * ) Notice: Subject to any disclaimer, the term of this patent is extended or adjusted under 35 U.S.C. 154(b) by 254 days.

(21) Appl. No.: 14/529,200

(22) Filed: Oct. 31, 2014

(65) Prior Publication Data

US 2015/0117946 A1  Apr. 30, 2015

(30) Foreign Application Priority Data

Oct. 31, 2013  (JP) .................. 2013-227401

(51) Int. Cl.
| | |
|---|---|
| *B60H 1/00* | (2006.01) |
| *B60K 11/06* | (2006.01) |
| *B60K 11/08* | (2006.01) |
| *B60K 37/04* | (2006.01) |
| *B62D 25/14* | (2006.01) |

(52) U.S. Cl.
CPC ....... *B60H 1/0055* (2013.01); *B60H 1/00535* (2013.01); *B60H 1/00564* (2013.01); *B60K 11/06* (2013.01); *B60K 11/085* (2013.01); *B60K 37/04* (2013.01); *B62D 25/142* (2013.01); *Y10T 403/7094* (2015.01)

(58) Field of Classification Search
CPC .............. B60H 1/0055; B60H 1/00535; B60H 1/00564; B60H 2001/3492; B62D 25/142; B60K 37/04; B60K 11/085; B60K 11/06; B60K 1/3121; Y10T 403/7094; Y10T 403/472; Y10T 403/606
USPC ......... 454/155; 292/80, 8, 87, 303; 220/242; 174/66, 67, 55, 56, 57
See application file for complete search history.

(56) References Cited

U.S. PATENT DOCUMENTS 2,791,957 A * 5/1957 Wendela .............. B60H 1/3407
454/146
3,381,601 A * 5/1968 McCabe ................. F24F 13/15
454/318

(Continued)

FOREIGN PATENT DOCUMENTS

JP  H04-078012 U  7/1992

*Primary Examiner* — Joshua J Michener
*Assistant Examiner* — Matthew Gitlin
(74) *Attorney, Agent, or Firm* — Metrolexis Law Group, PLLC

(57) ABSTRACT

A mounting structure of two resin components includes a primary component including an insertion piece extendedly provided from a base portion, and an engagement recessed portion formed in the insertion piece; and a secondary component formed capable of being mounted to the primary component and including an insertion portion configured to guide the insertion piece formed at the base portion, an engagement protruding portion formed in the insertion portion and configured to fit into the engagement recessed portion of the insertion piece, and a restriction wall configured to cover a root side of the insertion piece inserted into the insertion portion, and in a top plan view, a width of the restriction wall being gradually decreased toward a direction separating from a side where the primary component is mounted.

4 Claims, 10 Drawing Sheets

(56) References Cited

U.S. PATENT DOCUMENTS

| | | | | |
|---|---|---|---|---|
| 3,417,439 | A * | 12/1968 | Seckerson | B60R 13/0206 24/297 |
| 3,461,791 | A * | 8/1969 | Beyer | F24F 13/12 454/155 |
| 3,641,913 | A * | 2/1972 | Dennis | B60H 1/3428 454/155 |
| 3,762,303 | A * | 10/1973 | Hoffman | B60H 1/3414 454/332 |
| 3,996,845 | A * | 12/1976 | Harris | B23P 11/00 454/320 |
| 5,046,406 | A * | 9/1991 | Harris | F24F 13/15 454/202 |
| 5,230,655 | A * | 7/1993 | Thompson | F24F 13/15 454/202 |
| 5,573,458 | A * | 11/1996 | Chu | F24F 13/075 454/202 |
| 5,577,779 | A * | 11/1996 | Dangel | E05C 19/06 220/326 |
| 5,628,533 | A * | 5/1997 | Hill | B65D 50/046 292/80 |
| 5,931,514 | A * | 8/1999 | Chung | F16B 12/26 220/326 |
| 6,462,276 | B2 * | 10/2002 | Shimizu | H02G 3/30 174/659 |
| 6,608,766 | B2 * | 8/2003 | Wortman | G06F 1/182 220/324 |
| 7,178,855 | B2 * | 2/2007 | Catron | B60J 5/0468 24/297 |
| 7,467,455 | B2 * | 12/2008 | Aigner | B60R 19/52 29/449 |
| 7,805,815 | B2 * | 10/2010 | Babian | B60R 13/0206 24/295 |
| 8,287,009 | B2 * | 10/2012 | Dane | A61L 2/26 292/125 |
| 8,979,156 | B2 * | 3/2015 | Mally | F16B 5/0657 24/297 |
| 8,986,086 | B2 * | 3/2015 | Carlson | B60H 1/249 292/1 |
| 9,028,307 | B2 * | 5/2015 | Furukawa | B60H 1/3407 454/152 |
| 2011/0217915 | A1 * | 9/2011 | Sawada | B60H 1/3428 454/162 |

* cited by examiner

MOUNTING STRUCTURE OF RESIN COMPONENTS

BACKGROUND

1. Technical Field

The present invention relates to a mounting structure of resin components.

2. Background Art

In the prior art, a mounting structure of resin components, particularly a mounting structure of resin components to be mounted in a vehicle such as a car is assembled by engaging an engagement piece of a panel (finisher) and an engagement portion of a duct (casing body) with each other. In the engagement piece of the panel, a protruding piece protruding from the panel is formed with an engagement hole in a substantially square shape. The engagement portion of the duct is formed by removing a part of a plate of a casing body.

To assemble the panel and the duct, a position of a leading end of the protruding piece of the panel is aligned to that of the engagement portion of the duct, the both are positioned closer to each other, the engagement piece of the panel is elastically deformed to separate away from the engagement portion of the duct upward or downward to get over the engagement portion of the duct, and then elastically recovered to complete the engagement. However, by the deformation when the engagement piece of the panel is elastically deformed to get over the engagement portion of the duct, the engagement piece and the engagement portion can be engaged with each other in a state where twist is generated in a root portion of the engagement piece so that the engagement portion cannot be completely elastically recovered, in other words, in a state where the engagement piece is slightly raised due to the elastic deformation. Thus, when shock is applied from a front of a vehicle, shake is transmitted to an instrument panel of a vehicle, and when a weight causing removal of the instrument panel is applied, the engagement piece of the panel in the state of slightly being raised due to the elastic deformation may get over the engagement portion of the duct to release the engagement.

As described above, to prevent the engagement from being released, after the engagement piece of the panel and the engagement portion of the duct are engaged with each other in advance, the processing is previously performed by providing another process in which heat is applied to the engagement portion of the duct to swage, and adhesive is applied into a gap between the panel and the duct to improve strength of the engagement.

Herein, with reference to FIGS. 10 to 12, a finisher mounting structure of a vehicle air conditioner described in the patent literature 1 will be described. FIG. 10 is an overall perspective view illustrating a finisher mounting structure of a vehicle air conditioner of the prior art. Further, FIG. 11 is a perspective view illustrating an essential part of the finisher mounting structure of the vehicle air conditioner of the prior art before it is assembled. FIG. 12 is a perspective view of the essential part of the finisher mounting structure of the vehicle air conditioner of the prior art after it is assembled.

As illustrated in FIGS. 10 to 12, an air-conditioner casing body 11 is formed with two pairs of insertion grooves 12 at an upper portion and lower portion on both blow-off sides of the air-conditioner casing body 11. Two pairs of insertion pieces 14 are protrudingly provided from both sides of a finisher 13 to an air-conditioner casing body 11 side. An insertion groove 12 is formed with an engagement nail 15 as an engagement protruding portion, and engaged into an engagement hole 16 as an engagement recessed portion of the insertion piece 14. A horizontal grill 17 is configured at a front face of the finisher 13 to rectify air to be blown off. Further, a bracket 18 is used to mount the air-conditioner casing body 11 to the instrument panel (not illustrated).

An elastic stopper 19 is raised from an outside on a center line of the insertion groove 12, and includes a guide 19a in a tapered shape slightly extending to a leading end of the insertion piece 14, and further includes a hole 20 right below an extending portion. Therefore, as illustrated in FIG. 11, the insertion piece 14 is positioned closer to the insertion groove 12 as indicated with an arrow. When the insertion piece 14 is pressed in, as illustrated in FIG. 12, the engagement nail 15 is fitted into the engagement hole 16.

RELATED ART

Patent Literature 1: Japanese Utility Model Laid-Open No. 04-078012

SUMMARY

The methods for applying the heat to swage the engagement portion of the above-described duct of the prior art or injecting the adhesive into the gap between the panel and the duct need another new process in addition to an assembly process of the panel and the duct. Therefore, the number of processes is increased to deteriorate an operability.

Further, according to the finisher mounting structure of the vehicle air conditioner described in the patent literature 1, when the finisher is assembled to the air-conditioner casing body, an operation is necessary for mounting the insertion piece to an elastic stopper located in the back of an engagement nail. Therefore, the number of the processes is also increased to deteriorate the operability.

The present invention is directed to, in consideration of the above-described prior problems, provide a mounting structure of resin components capable of preventing engagement between the panel and the duct from being released when the shock is applied to the vehicle, without increasing the number of the assembly processes.

Means for Solving the Problems

To solve the above described problems, a mounting structure of resin components of the present invention is a mounting structure of two resin components and includes a primary component including an insertion piece extendedly provided from a base portion, and an engagement recessed portion formed in the insertion piece; and a secondary component formed capable of being mounted to the primary component, and including an insertion portion configured to guide the insertion piece formed at the base portion, an engagement protruding portion formed in the insertion portion and configured to fit into the engagement recessed portion of the insertion piece, and a restriction wall configured to cover a root side of the insertion piece inserted into the insertion portion, in a top plan view, a width of the restriction wall being gradually decreased toward a direction separating from a side where the primary component is mounted.

Further, in the mounting structure of the resin components of the present invention, the restriction wall may include a guide portion configured to guide a leading end portion of the insertion piece to a back end side of the insertion portion, and a pressing portion configured to cover a root portion of the insertion piece engaged with the engagement protruding portion Furthermore, in the mounting structure of the resin components of the present invention, the primary component is a panel member of an air conditioner, and the secondary component is a duct member thereof.

DETAILED DESCRIPTION

Subsequently, with reference to drawings, the embodiment for implementing the present invention will be described in detail. In each diagram, the same reference symbol is applied to the same or corresponding portion, and the descriptions are appropriately simplified or not repeatedly described. An example of the embodiment of the present invention relates to a mounting structure of resin components and, particularly, to a panel (finisher) mounting structure of an air conditioner (wind-direction adjustment apparatus) to be mounted to a car, and further particularly relates to a mounting structure of an insertion portion of a duct member and an insertion piece of a panel member at a wind blowing opening of the air conditioner (wind-direction adjustment apparatus).

Figure 1:
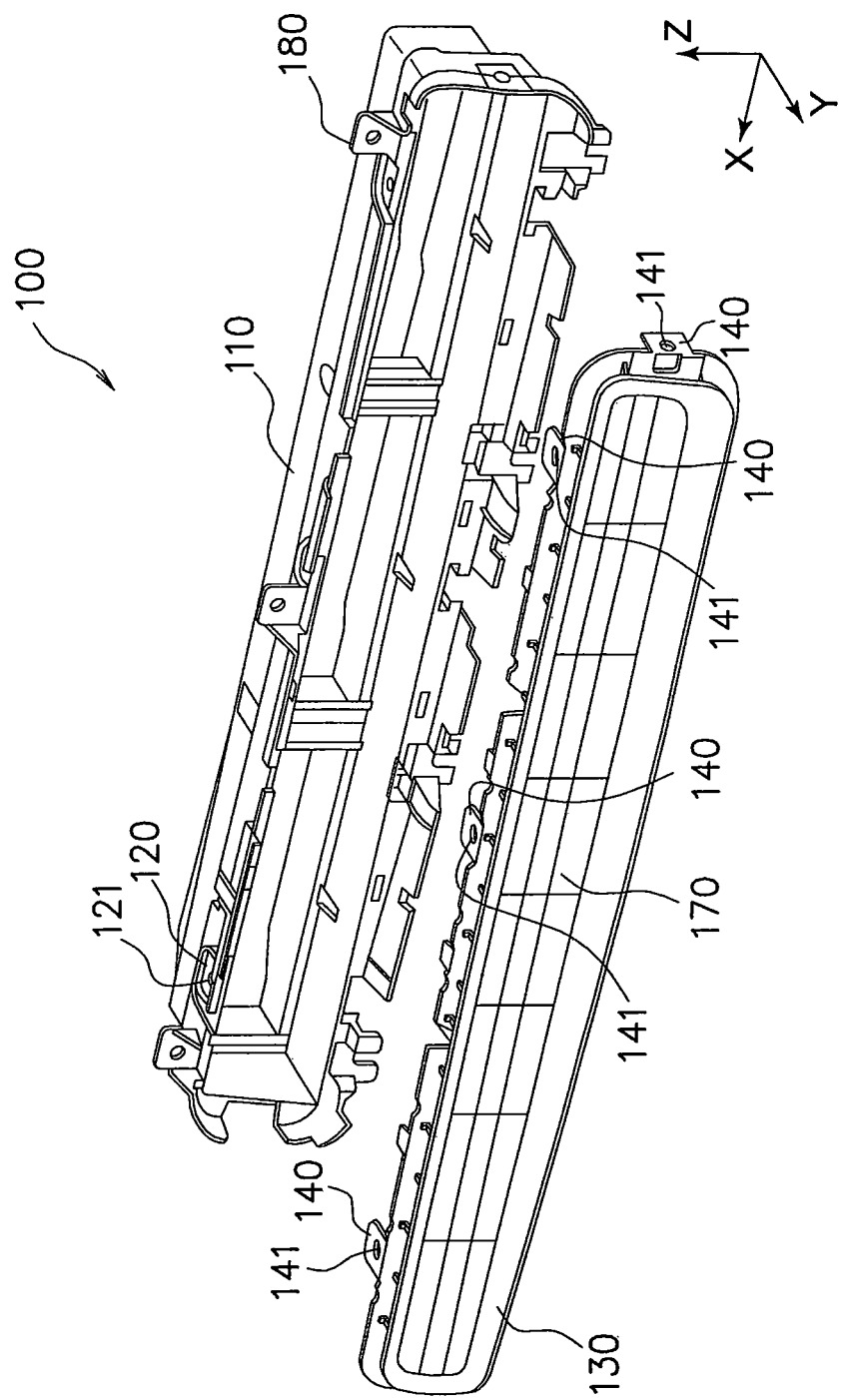
FIG. 1 is an overall perspective view illustrating a mounting structure of resin components according to the present embodiment before a panel and a duct included in the mounting structure thereof are assembled.
Figure 2:
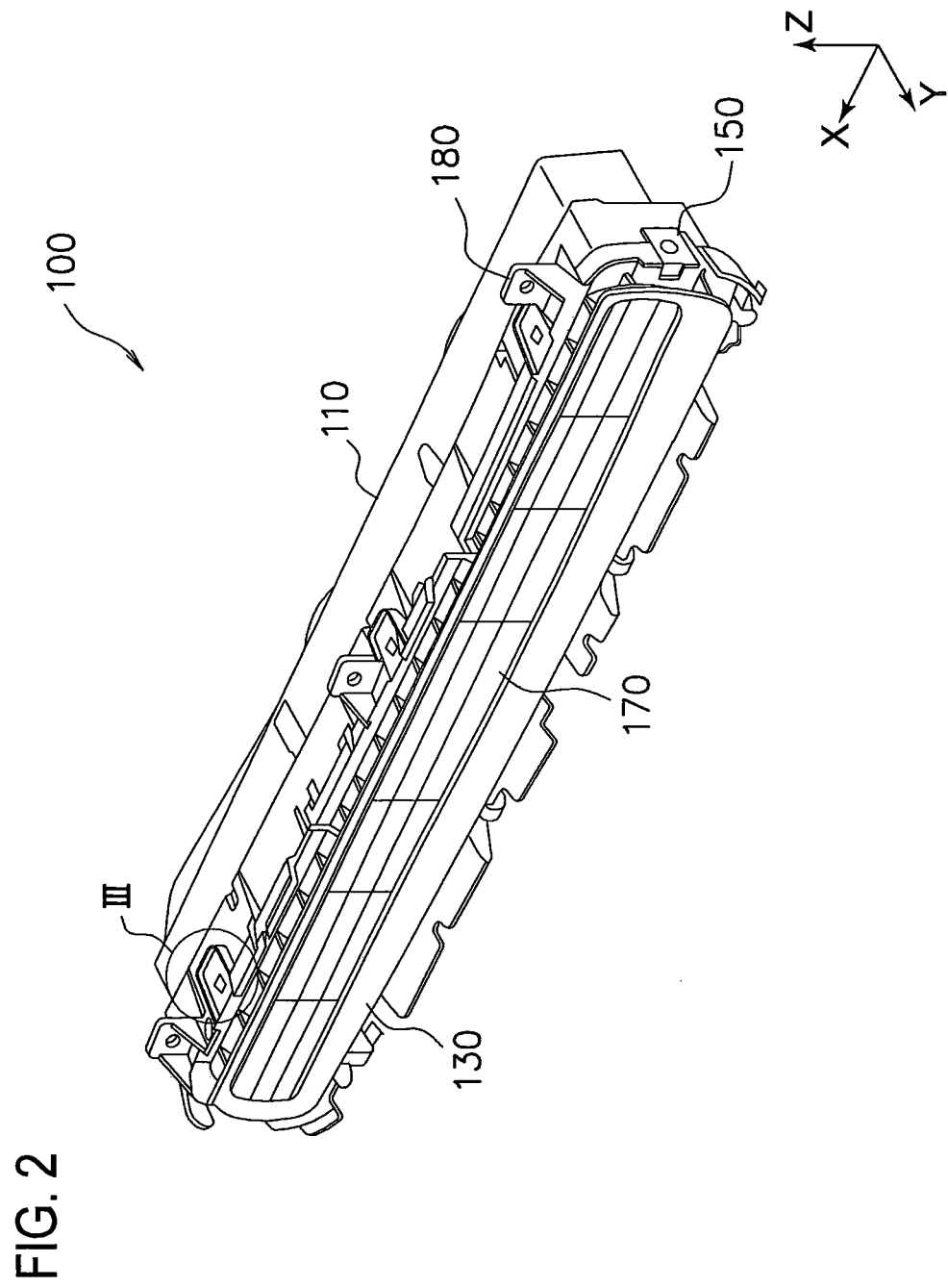
FIG. 2 is an overall perspective view illustrating the mounting structure of the resin components according to the present embodiment after the panel and the duct included in the mounting structure thereof are assembled.

First of all, the overall perspective views illustrating the mounting structure of the resin components according to the present embodiment before and after the panel and the duct included in the mounting structure thereof are assembled. FIG. 1 is an overall perspective view illustrating a mounting structure of resin components according to the present embodiment before a panel and a duct included in the mounting structure thereof are assembled. FIG. 2 is an overall perspective view illustrating the mounting structure of the resin components according to the present embodiment after the panel and the duct included in the mounting structure thereof are assembled.

As illustrated in FIG. 1, a mounting structure body 100 of the resin components includes a panel 130 that is a primary component being hollow and in a substantially cuboid shape and a duct 110 that is a secondary component being hollow and in a substantially cuboid shape. The panel 130 is extendingly provided from a base portion of the panel 130 and includes an insertion piece 140 to be inserted into a insertion portion 120 of the duct 110, and an engagement hole 141 (engagement recessed portion) formed at a substantially center portion of the insertion piece 140, and a horizontal grill 170 configured at a front face of the panel 130 and functioning to rectify blow-off air.

The duct 110 comprises the insertion portion 120 guiding the insertion piece 140 of the panel 130, an engagement nail 121 (engagement protruding portion) formed at a substantially center portion of the insertion portion 120 and fitting into the engagement hole 141 of the panel 130, and a bracket 180 for mounting the mounting structure body 100 of the resin component to the instrument panel (not illustrated).

The insertion piece 140 of the panel 130 is guided to the insertion portion 120 of the duct 110, and when the engagement nail 121 of the duct 110 and the engagement hole 141 of the panel 130 are fitted with each other, as illustrated in FIG. 2, the assembly between the duct 110 and the panel 130 included in the mounting structure body 100 of the resin component can be realized.

It is estimated that the engagement portion obtained by assembling the insertion piece 140 of the panel 130 and the insertion portion 120 of the duct 110 is provided in a longer direction of the mounting structure body 100 of the resin components. However, if the number of assembly processes is not to be changed, an engagement portion 150 may be provided in a shorter direction of the mounting structure body 100 thereof. In addition to the longer direction of the mounting structure body 100 of the resin components, when the engagement portion 150 is provided also in the shorter direction, the assembly between the panel 130 and the duct 110 can be more strengthened.

Hereinafter, the longer direction of the mounting structure body 100 is specified as an x-axis direction. The shorter direction of the mounting structure body 100, in other words, a direction in which, when the duct 110 and the panel 130 are assembled, the insertion piece 140 is inserted into the insertion portion 120 is specified as a y-axis direction. Further, a height direction, in other words, a direction orthogonal to both the x-axis direction and the y-axis direction of the mounting structure body 100 is specified as a z-axis direction. More specifically, as illustrated in FIG. 1, each of the x-axis direction, the y-axis direction, and the z-axis direction is specified. A term of "top plan view" is defined as viewing the mounting structure body 100 in the z-axis direction that is the height direction of the mounting structure body 100.

Figure 3:
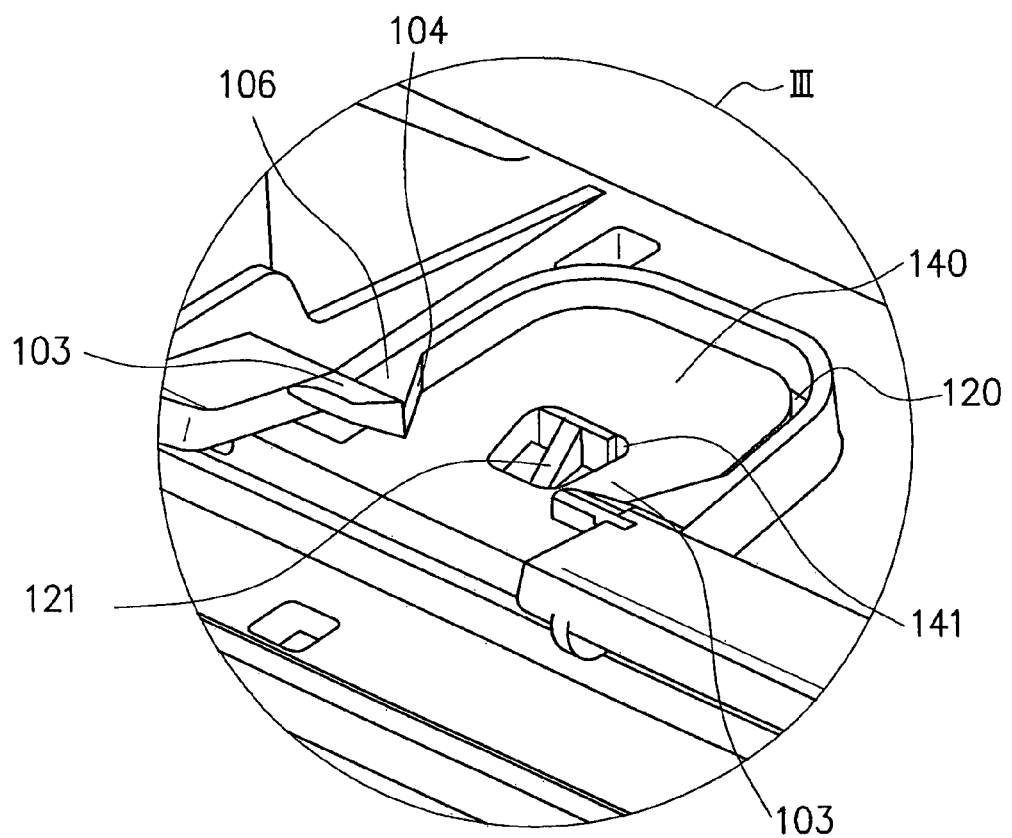
FIG. 3 is a perspective view illustrating a III portion illustrated in FIG. 2.

Subsequently, the essential part of the mounting structure of the resin components according to the present embodiment after the panel and the duct included in the mounting structure thereof are assembled will be described. FIG. 3 is a perspective view of the III portion illustrated in FIG. 2.

As illustrated in FIG. 3, when the panel 130 and the duct 110 are assembled, if a leading end portion of the insertion piece 140 of the panel 130 comes into contact with the engagement nail 121 formed at the substantially center portion of the insertion portion 120 of the duct 110, the insertion piece 140 warps toward a side separating from the duct 110 in a direction orthogonal to an insertion direction. Subsequently, when the insertion piece 140 gets over the height of the engagement nail 121 to return to a side getting closer to the duct 110, a warp state is released. As described above, the engagement nail 121 is fitted into the engagement hole 141.

When the leading end portion of the insertion piece 140 of the panel 130 comes into contact with the engagement nail 121 of the duct 110, the leading end portion of the insertion piece 140 warps to the side separating from the duct 110 in the direction orthogonal to the insertion direction of the insertion piece 140. When the insertion piece 140 is inserted into the back of the insertion portion 120, a panel guide portion 103 and a panel pressing portion 106 (pressing portion) cover a root side of the insertion piece 140 that is an opposite side of the leading end portion of the insertion piece 140. The root side of the insertion piece 140 refers to a vicinity of a portion of the insertion piece 140 to be connected with a base portion of the panel 130.

When the insertion piece 140 is inserted into the back of the insertion portion 120, the panel guide portion 103 and the panel pressing portion 106 (pressing portion) cover the root side of the insertion piece 140, and therefore, the panel guide portion 103 and the panel pressing portion 106 (pressing portion) function as a restriction wall for stopping the insertion piece 140 of the panel 130 from removing from the insertion portion 120 of the duct 110 while preventing an urging force generated by the warp of the insertion piece 140 from being disturbed. With this arrangement, when the panel 130 is assembled with the duct 110, the insertion piece 140 of the panel 130 can be prevented from removing from the insertion portion 120 of the duct 110.

The above described point will be described in detail. The panel guide portion 103 guides the insertion piece 140 of the panel 130 to the insertion portion 120 of the duct 110 for easy insertion, since an insertion opening portion at the insertion portion 120 of the duct 110 where the panel 130 is inserted is widely formed in the height direction.

A width of the panel pressing portion 106 is formed in a tapered shape that is gradually decreased in a direction from a root of the insertion piece 140 to the leading end side of the insertion piece 140 (a side, when the insertion piece 140 of the panel 130 is inserted into the insertion portion 120 of the duct 110, the insertion piece 140 of the panel 130 is first inserted into the insertion portion 120 of the duct 110). In other words, the panel pressing portion 106 has a shape in which the width measured along the x-axis direction of the panel pressing portion 106 is gradually decreased from a side of the panel 130 toward a side of the duct 110 along the y-axis direction.

Further, a height of the engagement nail 121 formed at the substantially center portion of the insertion portion 120 of the duct 110 is gradually increased from the side of the insertion opening portion of the insertion portion 120 toward the back side in the insertion direction. Herein, the height of the engagement nail 121 means a height measured from a bottom face of the insertion portion 120.

With this arrangement, when the insertion piece 140 is inserted into the insertion portion 120, after the leading end portion of the insertion piece 140 is abutted on the engagement nail 121, the insertion piece 140 of the panel 130 warps to the side separating from the duct 110 in a direction orthogonal to the insertion direction. While preventing the urging force generated to get over the engagement nail 121 from being disturbed, the insertion piece 140 gets over the engagement nail 121 to complete the engagement.

In a state where the insertion piece 140 is engaged with the engagement nail 121, the panel guide portion 103 and the panel pressing portion 106 (pressing portion) cover the root side of the insertion piece 140 that is the opposite side of the leading end portion of the insertion piece 140. Therefore, when the shock is applied from the front of the vehicle, a movement in which the insertion piece 140 is raised to get over the engagement nail 121 is blocked by the panel pressing portion 106. Therefore, even when the shock is applied from the front of the vehicle, an engagement state between the insertion piece 140 and the engagement nail 121 can be prevented from being released.

Figure 4:
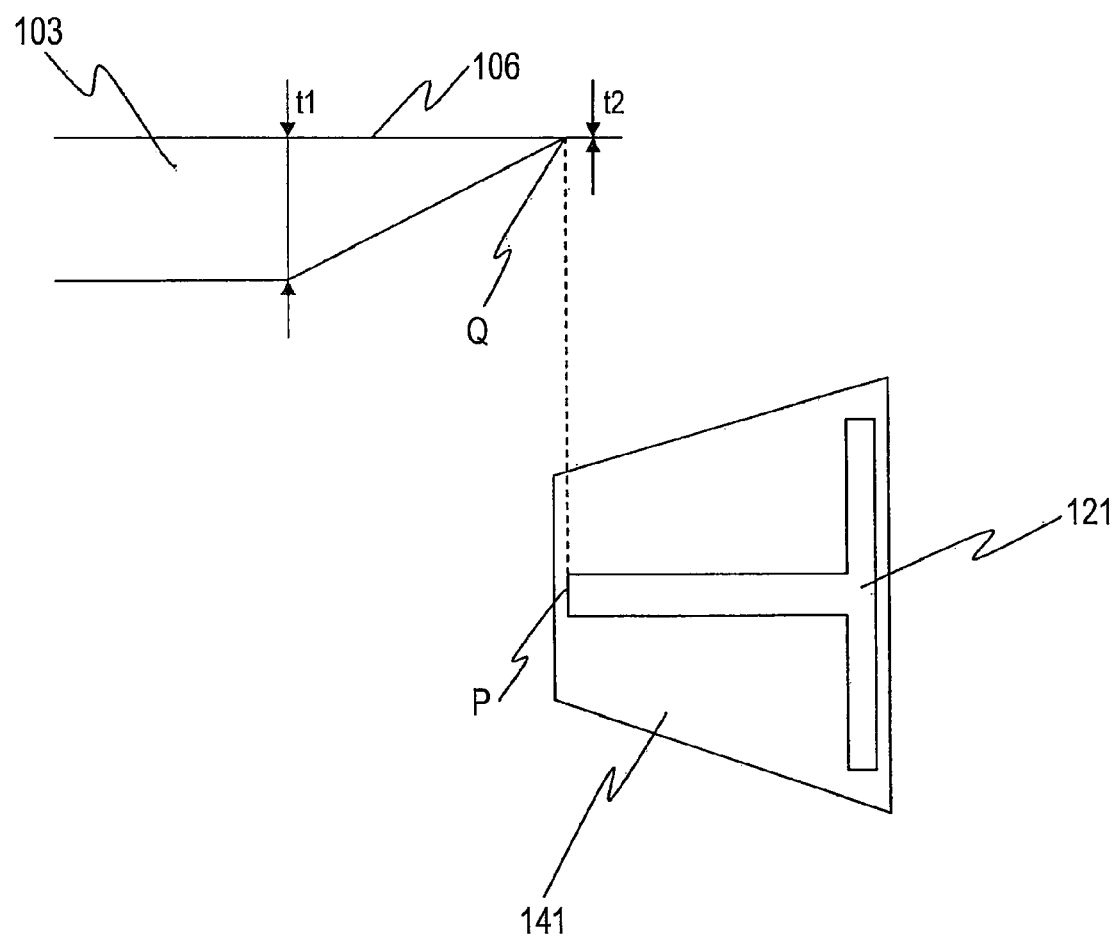
FIG. 4 is a top plan view illustrating a relationship between a width of a panel pressing portion and an engagement nail in a state of the mounting structure of the resin components according to the present embodiment after the panel and the duct included in the mounting structure thereof are assembled.

Herein, in the overall perspective view (FIG. 2) illustrating the mounting structure of the resin components according to the present embodiment after the panel and the duct included in the mounting structure thereof are assembled, the relationship between the width of the panel pressing portion 106 and the engagement nail 121 will be described. FIG. 4 is a top plan view illustrating the relationship between the width of the panel pressing portion 106 and the engagement nail 121 in a state of the mounting structure of the resin components according to the present embodiment after the panel and the duct included in the mounting structure thereof are assembled. As illustrated in FIG. 4, a width (t2) of the panel pressing portion 106 is minimum at a point where the engagement nail 121 starts to rise, more specifically, at a point "Q" where a straight line drawn in parallel with the longer direction of the mounting structure body 100 of the resin component passing a point "P" where the height of the insertion portion 120 is equal to the height of the engagement nail 121 and the panel pressing portion 106 of the duct 110 abut on each other.

This is because, when the panel pressing portion 106 is formed at a position right beyond the point "Q", the leading end portion of the insertion piece 140 of the panel 130 cannot get over the engagement nail 121 of the duct 110, and thus the insertion piece 140 of the panel 130 cannot be inserted into the insertion portion 120 of the duct 110.

The width of the panel pressing portion 106 is formed to become linearly thinner from the side of the insertion opening portion of the insertion portion 120 toward the back side in the insertion direction, but, it may be formed to become thinner in an arc-like shape from the side of the insertion opening portion of the insertion portion 120 toward the back side in the insertion direction. In other words, the panel pressing portion 106 is formed in a shape of a protruding face shape toward the insertion portion 120.

Figure 5:
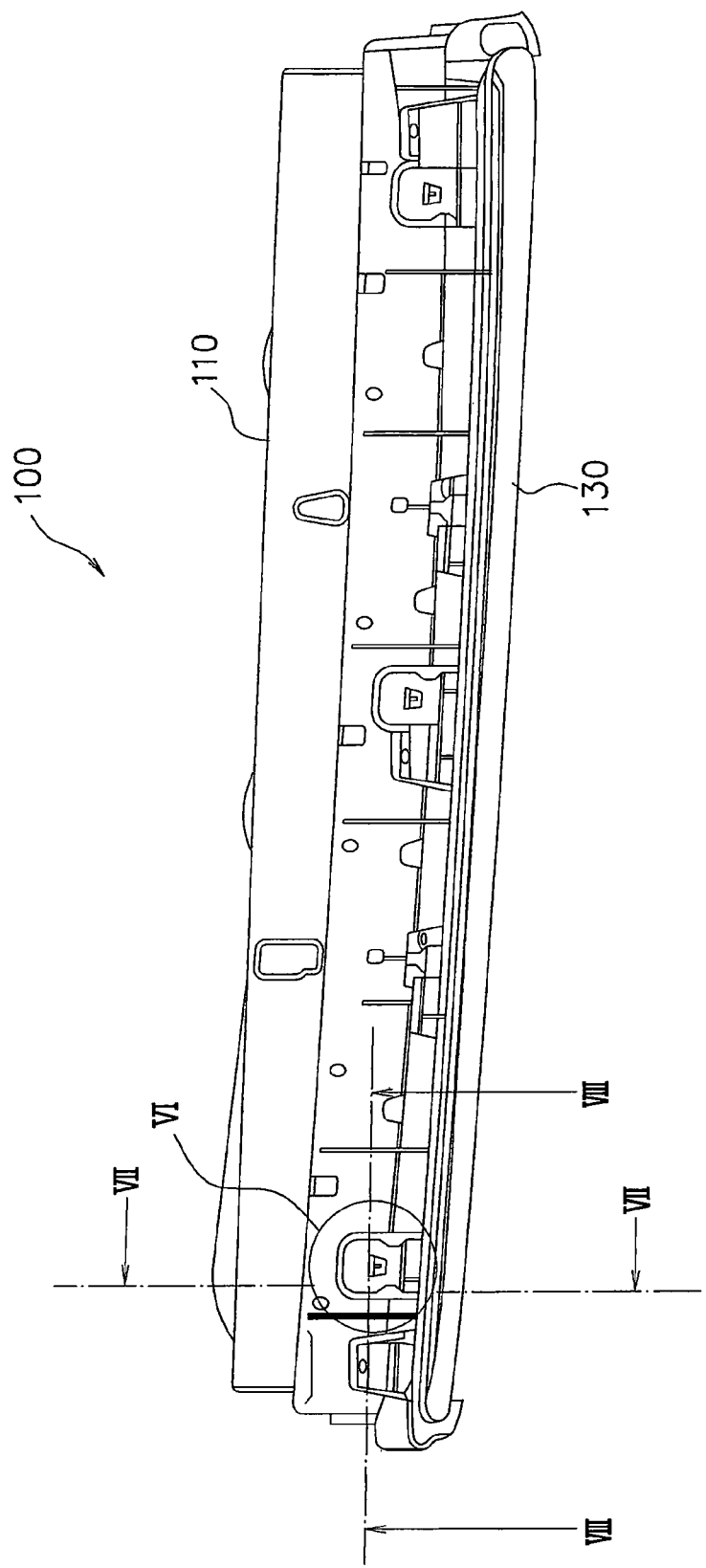
FIG. 5 is an overall top plan view illustrating a state of the mounting structure of the resin components according to the present embodiment after the panel and the duct included in the mounting structure thereof are assembled.

Subsequently, the essential part of the mounting structure of the resin components according to the present embodiment after the panel and the duct included in the mounting structure thereof are assembled will be described. FIG. 5 is a top plan view of the mounting structure of the resin components according to the present embodiment after the panel and the duct included in the mounting structure thereof are assembled. Further, FIG. 6 is an enlarged view of the VI portion illustrated in FIG. 5.

Figure 6:
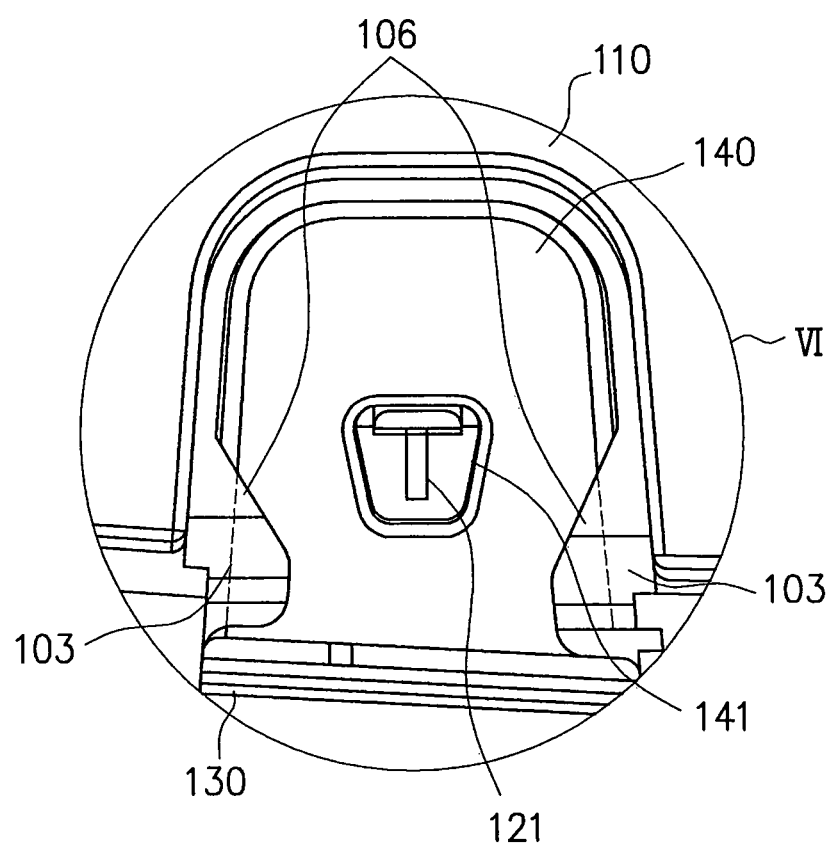
FIG. 6 is an enlarged view illustrating a VI portion illustrated in FIG. 5.

As illustrated in FIG. 6, when the panel 130 and the duct 110 are assembled at the VI portion illustrated in FIG. 5, the leading end portion of the insertion piece 140 of the panel 130 comes into contact with the engagement nail 121 formed at the substantially center portion of the insertion portion 120 of the duct 110, and thus the insertion piece 140 of the panel 130 warps in a direction orthogonal to the insertion direction of the insertion piece 140 (direction from a sheet face to a near side in FIG. 6). A predetermined amount of warp force is restrained by the panel pressing portion 106, but, the warp of the insertion piece 140 is permitted to a necessary amount so that the insertion piece 140 can get over the engagement nail 121. Therefore, the assembly between the panel 130 and the duct 110 are not disturbed. Further, when the insertion piece 140 is inserted into the insertion portion 120, the panel guide portion 103 formed at the insertion opening portion at the insertion portion 120 of the duct 110 into which the panel 130 is inserted is widely formed in the height direction. Therefore, the insertion piece 140 is guided to be easily inserted into the insertion portion 120 to further improve the operability of assembly.

A cross-sectional view in a state of the mounting structure of the resin components according to the present embodiment after the panel and the duct included in the mounting structure thereof are assembled will be described.

Figure 7:
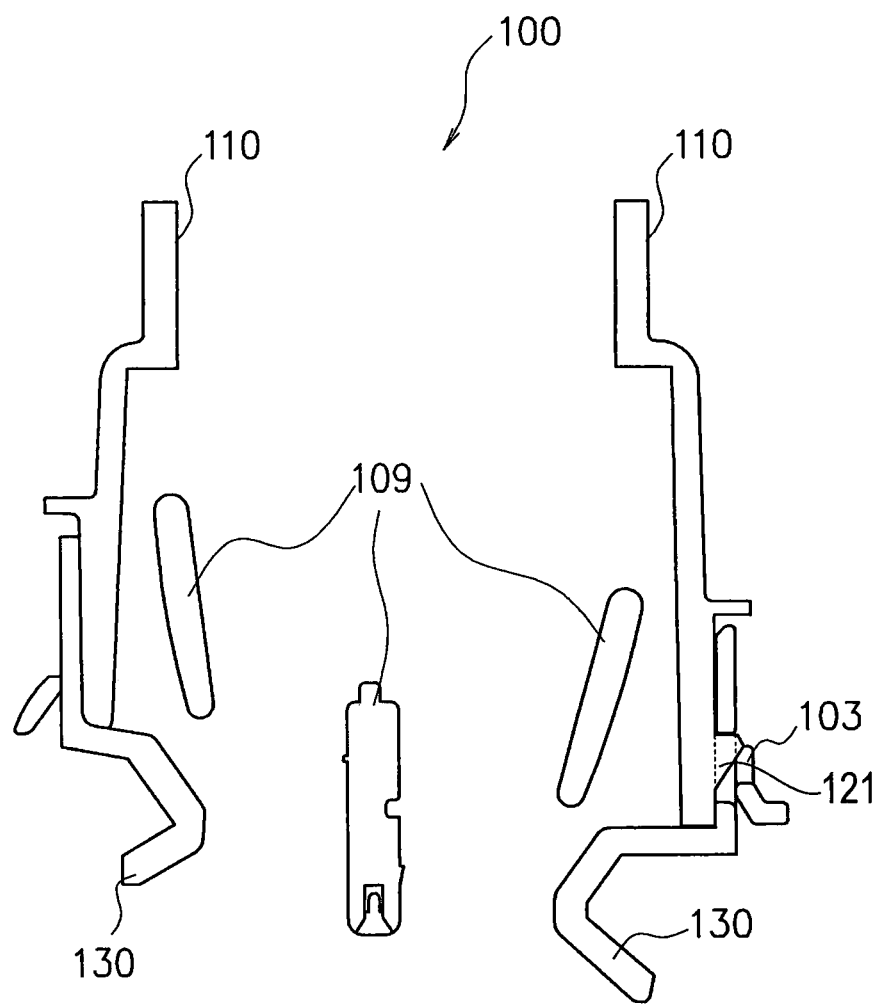
FIG. 7 is a cross-sectional view taken along the line VII-VII illustrated in FIG. 5.

FIG. 7 is a cross-sectional view taken along the line VII-VII illustrated in FIG. 5 in a state of the mounting structure of the resin components according to the present embodiment after the panel and the duct included in the mounting structure thereof are assembled. FIG. 7 illustrates a cross section of the mounting structure body 100 on a plane face in parallel to a yz-plane passing the engagement nail 121.

Figure 8:
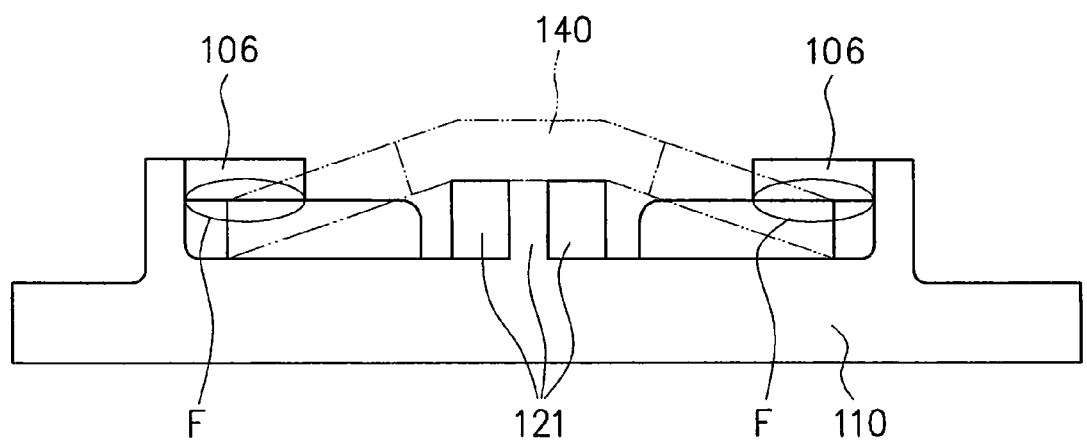
FIG. 8 is a cross-sectional view taken along the line VIII-VIII illustrated in FIG. 5.

FIG. 8 is a cross-sectional view taken along the line VIII-VIII illustrated in FIG. 5 in a state of the mounting structure of the resin components according to the present embodiment after the panel and the duct included in the mounting structure thereof are assembled. FIG. 8 is an enlarged view of a vicinity of the VI portion of the cross section of the mounting structure body 100 on the plane face in parallel to an xz-plane passing the panel pressing portion 106.

As illustrated in FIG. 7, inside the mounting structure body 100, a front fin 109 for adjusting a direction of the blow-off air is provided. Further, as illustrated in FIG. 8, the insertion piece 140 of the panel 130 is inserted into the insertion portion 120 of the duct 110, and the engagement nail 121 of the duct 110 is fitted into the engagement hole 141 of the panel 130. Even if a weight is applied to the instrument panel due to the shock from the front of the vehicle (not illustrated) and the shake transmitted to the instrument panel of the vehicle caused by the shock, a movement of the insertion piece 140 for getting over the engagement nail 121 is blocked by the panel pressing portion 106. More specifically, even if the insertion piece 140 tries to get over the engagement nail 121, the panel pressing portion 106 interferes with the insertion piece 140 at a position indicated at an "F" portion illustrated in FIG. 8, and thus the insertion piece 140 cannot get over the engagement nail 121. Therefore, the engagement between the panel 130 and the duct 110 is not released.

Figure 9:
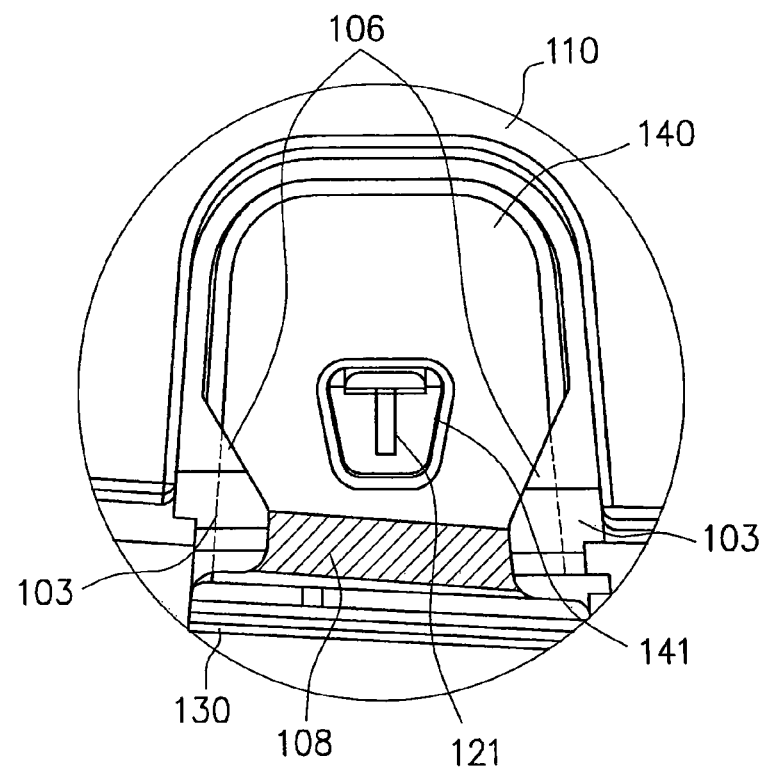
FIG. 9 is an enlarged view of a portion corresponding to the VI portion illustrated in FIG. 6 in a state of the mounting structure of the resin components according to another embodiment after the panel and the duct included in the mounting structure thereof are assembled.
Figure 10:
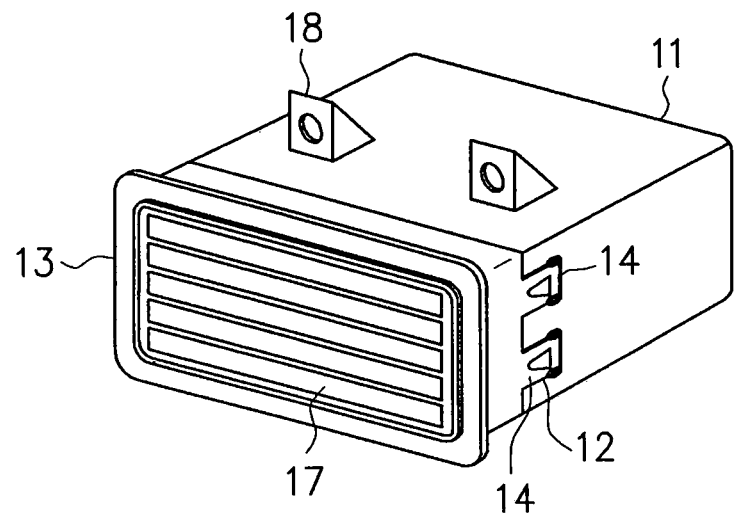
FIG. 10 is an overall perspective view illustrating a finisher mounting structure of the vehicle air conditioner of the prior art.
Figure 11:
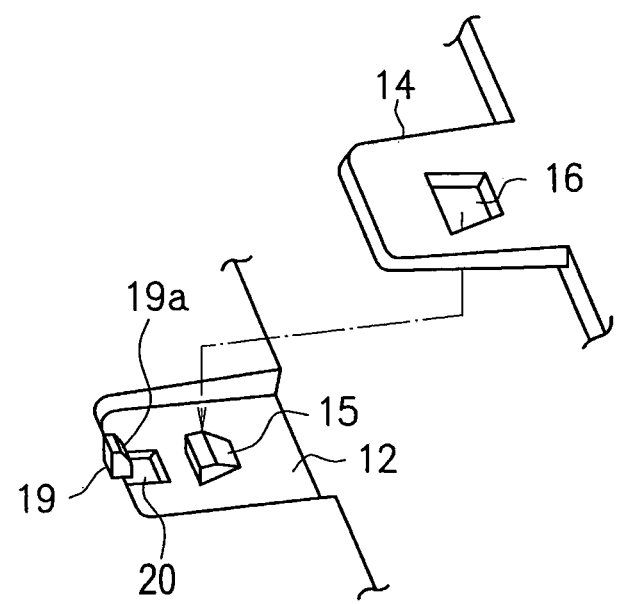
FIG. 11 is a perspective view of an essential part of the finisher mounting structure of the vehicle air conditioner of the prior art before it is assembled.
Figure 12:
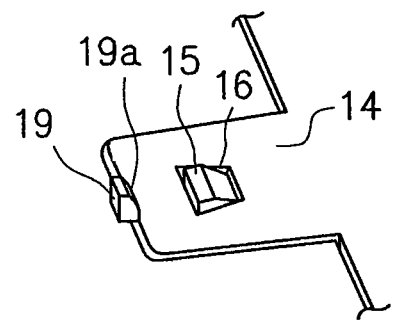
FIG. 12 is a perspective view of the essential part of the finisher mounting structure of the vehicle air conditioner of the prior art after it is assembled.

The essential part of the mounting structure of the resin components according to another embodiment after the panel and the duct included in the mounting structure of the resin components according to the present embodiment will be further described in detail. FIG. 9 is an enlarged view of a portion corresponding to the VI portion illustrated in FIG. 6 in a state of the mounting structure of the resin components according to the another embodiment after the panel and the duct included in the mounting structure thereof are assembled.

FIG. 9 illustrates a state where the right and left panel guide portions 103 of the duct 110 are connected with each other by a connection portion 108. With this arrangement, since the insertion piece 140 of the panel 130 can be easily inserted into the insertion portion 120 of the duct 110, the operability can be improved, and the engagement between the panel 130 and the duct 110 can be firmly prevented from being released.

The mounting structure of the resin components according to the present embodiment can be generally adopted to the vehicles that mount the air conditioner.

As described above, according to the present invention, there can be provided the mounting structure of the resin components capable of preventing the engagement between the panel and the duct from being released, when the shock is applied to the vehicle, without increasing the number of the assemble processes for the mounting structure of the resin components.

The present invention has been described using the preferable embodiments. The specific examples are used to describe the present invention herein, but, without departing from the ideas in a wide range and the scope of the present invention defined in the claims of the patent, various corrections and modifications for the specific examples can be implemented.

The present application claims the priority based on Japanese Patent Application No. 2013-227401 filed on the Oct. 31, 2013, and the entire content of the application is incorporated in the present specification as reference.

INDUSTRIAL APPLICABILITY

According to the present invention, there is provided the mounting structure of the resin components capable of preventing the engagement between the panel and the duct from being released, when the shock is applied to the vehicle, without increasing the number of the assemble processes.

REFERENCE SIGNS LIST 100 mounting structure body of resin components
103 panel guide portion
106 panel pressing portion
108 connection portion
109 front fin
110 duct
120 insertion portion
121 engagement nail
130 panel
140 insertion piece
141 engagement hole
150 engagement portion
170 horizontal grill
180 bracket

What is claimed is:

1. A mounting structure of resin components that is a mounting structure of two resin components, comprising:
   a primary component including an insertion piece extendedly provided from a base portion, and an engagement recessed portion formed in the insertion piece; and
   a secondary component capable of being mounted to the primary component, and including an insertion portion configured to guide the insertion piece formed at the base portion, an engagement protruding portion formed in the insertion portion and configured to fit into the engagement recessed portion of the insertion piece, and a restriction wall configured to cover a root side of the insertion piece inserted into the insertion portion in a top plan view of the mounting structure, wherein
   the restriction wall has a tapered shape,
   in the top plan view of the mounting structure, a width of the tapered shape is decreased toward an insertion direction of the insertion piece, the insertion direction is a direction separating from a side of the insertion portion where the primary component is mounted, the tapered shape permits the insertion piece to warp toward a direction orthogonal to the insertion direction of the insertion piece and to get over engagement protruding portion, and the tapered shape stops the insertion piece inserted into the insertion portion from removing from the insertion portion.

2. The mounting structure of resin components according to claim 1, wherein the restriction wall includes a guide portion configured to guide a leading end portion of the insertion piece to a back end side of the insertion portion, and a pressing portion configured to cover a root portion of the insertion piece engaged with the engagement protruding portion.

3. The mounting structure of resin components according to claim 2, wherein the primary component is a panel member of an air conditioner, and the secondary component is a duct member of the air conditioner.

4. The mounting structure of resin components according to claim 1, wherein the primary component is a panel member of an air conditioner, and the secondary component is a duct member of the air conditioner.

* * * * *